United States Patent [19]

Register et al.

[11] Patent Number: 5,241,303
[45] Date of Patent: Aug. 31, 1993

[54] PORTABLE COMPUTER WITH PHYSICAL RECONFIGURATION OF DISPLAY CONNECTION FOR STYLUS AND KEYBOARD ENTRY

[75] Inventors: David S. Register; J. Michael O'Dell, both of Austin; Robert Groover, III, Dallas, all of Tex.

[73] Assignee: Dell USA, L.P., Austin, Tex.

[21] Appl. No.: 814,338

[22] Filed: Dec. 26, 1991

[51] Int. Cl.⁵ .............................................. G09G 3/02
[52] U.S. Cl. ...................................... 340/706; 340/711; 340/712; 178/19
[58] Field of Search ............... 340/700, 706, 711, 712; 364/708; 178/18, 19; 361/390, 391, 392, 393

[56] References Cited

U.S. PATENT DOCUMENTS

4,926,010 5/1990 Citron ................................ 178/18
4,937,563 7/1990 Shekita et al. ..................... 340/711
5,049,862 9/1991 Dao et al. .......................... 340/726
5,107,402 4/1992 Malgouires ........................ 364/708

*Primary Examiner*—Alvin E. Oberley
*Assistant Examiner*—Xiao M. Wu
*Attorney, Agent, or Firm*—Thomas G. Devine; James W. Huffman

[57] ABSTRACT

A computer system which is reconfigurable to provide separate ergonomically advantageous positions for keyboard input and for stylus input. A primary system chassis contains a bay in its underside where a detachable keyboard can be stored. For one-hand stylus input, the keyboard is left in its bay while the display is mounted flat on top of the system chassis. For keyboard input, the keyboard is mounted on the system chassis, and the display is supported at an angle which makes it easily visible to a user typing on the keyboard.

16 Claims, 7 Drawing Sheets

PORTABLE COMPUTER WITH PHYSICAL RECONFIGURATION OF DISPLAY CONNECTION FOR STYLUS AND KEYBOARD ENTRY

PARTIAL WAIVER OF COPYRIGHT

All of the material in this patent application is subject to copyright protection under the copyright laws of the United States and of other countries. As of the first effective filing date of the present application, this material is protected as unpublished material.

Portions of the material in the specification and drawings of this patent application are also subject to protection under the maskwork registration laws of the United States and of other countries.

However, permission to copy this material is hereby granted to the extent that the owner of the copyright and maskwork rights has no objection to the facsimile reproduction by anyone of the patent document or patent disclosure, as it appears in the United States Patent and Trademark Office patent file or records, but otherwise reserves all copyright and maskwork rights whatsoever.

CROSS-REFERENCE TO OTHER APPLICATIONS

The following applications of common assignee each contain at least one drawings in common with the present application, and are believed to have effective filing dates identical with that of the present application, and are all hereby incorporated by reference:

Ser. No. 07/814,028, filed Dec. 26, 1991, entitled "Portable Computer with Screen Reversible for Stylus and Keyboard Entry";

Ser. No. 07/814,733, filed Dec. 26, 1991, entitled "Stylus-Operable Computer with Wireless Keyboard in Storage Bay";

Ser. No. 07/814,732, filed Dec. 26, 1991, entitled "Stylus-Operated Computer with Folding Cover Convertible to Display Stand";

all of which are hereby incorporated by reference.

BACKGROUND AND SUMMARY OF THE INVENTION

The present invention relates to computer systems (and particularly to small computer systems), and to methods for using them.

The innovations disclosed in the present application provide computer systems (especially very small portable personal computers) which have advantageous new capabilities for both keyboard and stylus input. To better explain the significance and advantages of these innovations, the following paragraphs (down to page 9) will review some technological context. This technological context is not necessarily prior art, but is intended to help in pointing out the disclosed inventions.

Stylus-Operable Computers[1]

As portable computers have continued to shrink, continuing efforts have been made to identify a new input channel to replace the keyboard. A great deal of design effort was needed to design notebook computers with a compacted keyboard which still had the key spacing to permit touch typing. However, at sizes below the "notebook" computer, there is no simply no room for a keyboard with standard key spacing and number of characters.

[1]Stylus-input computers are also commonly referred to as "pen-based" computers, or "slate" computers.

Thus, in the 1990s a great deal of acitivity has been devoted to computer systems which can be operated by a user using a stylus as a primary input device. Such an input device has many advantages: it is inherently very well suited to menu-based command inputs. It is inherently well suited to use with a small screen, since whatever screen area is available can be allocated among various boxes which can be checked or written in by the user. It is also inherently well suited to use by marginally literate persons, and to rapid input in environments where a user's full intention is not available, since the interface is inherently well-suited to graphical rather than character-based input.

In order to realize the full potential of stylys entry as an this input channel, some degree of recognition capability for handwritten stylus inputs is necessary. It appears that the processor capability, power-management capability, and display and touch screen technology required for such computers is now available. Large improvements in operating system software technology in this area are to be expected, but a first generation of functional system software is already available. However, a great deal of improvement remains for making this class of computers adequately comfortable and user-friendly.

Thus, as available computing power increases, stylus-capable computers (using recognition of handwritten inputs by a stylus acting upon the display surface) are becoming more practical.

A number of companies have recently announced pen-based computer products. See, for example, Shipley, "Pen-based PCs ready for prime time," in PC-COMPUTING, vol. 4 no. 11 (Nov. 1991), at 214 ff, which is hereby incorporated by reference. This and other articles[2] discuss machines announced by vendors including Tusk, Momenta, Grid, NCR, Samsung, Pi Systems, TelePad Inc. and other vendors.

[2]See also Schroeder et al., "Momenta to head parade of pen PCs: firm to bundle new machine with proprietary OS, applications," in PC WEEK vol. 8 no. 39 (Sept 30, 1991), at page 4; Davis, "NCR's pen-based PC signals the birth of a new market," in PC WEEK vol. 8 no. 27 (Jul. 8, 1991) at page 134; Catchings et al., "NCR NotePad delivers 3-in-1 pen computing," in PC WEEK vol. 8 no. 26 (Jul. 1, 1991) at pages 1-2; all of which are hereby incorporated by reference.

In particular, portable computer applications are attractive candidates for stylus input systems, as mobile users often must enter data while standing, holding the computer unit in one hand, and the stylus in the other. For example, it has been suggested that a small portable dedicated computer, for specialized data entry or control applications, could advantageously be configured so that the user could hold the unit in one hand while marking on it with a stylus in the other hand.

Touch-Screen Menu Selection

An older system architecture, which attempted to fill some of these needs, used touch-screen input for menu selection. For example, a user would be should a menu with 8 boxes on the screen; and when the user touched one box, a new menu (with a new set of options depending on which box the user had previously touched) would appear.

For special applications, where custom software can be developed, such menus offer rapid access to a range of commands. Moreover, such systems provide a simple interface and compact size, but are inherently very limited in their ability to deviate from a standard menu sequence, or to accept unexpected user input. Thus, such a user interface is not very suitable to a general purpose computer.

It should also be noted that the technology of such simple touch-screen computers differs very substantially from that of the stylus-operated computers which are now beginning to appear. A general-purpose stylus-operated computer must have some capability for recognizing handwriting (at least handprinted letters, if not script). Thus, a relevant hardware parameter is the dimensional resolution of the touch-screen input: the spatial resolution needed for touch menu selection can be as coarse as a centimeter or more, whereas the spatial resolution needed for recognition of handwritten inputs should probably be 200 or more per inch.

Handwriting Recognition

Automatic recognition of handwritten inputs is an area which has been the subject of significant research effort in a large-computer environments. Sophisticated algorithms for handwriting recognition have been developed, but previously there was no driving application to migrate these algorithms to microcomputer-based hardware.

Stylus-Capable Operating Systems

Of course, pen-sensitive hardware would not be useful without appropriate software. Specifically, a viable pen computer market requires system software which can handle a user's pen inputs and pass them in a standard fashion to the application software.

This has been a very active areas of development in the 1990s. Currently the leading pen-based operating systems are PenPoint TM from Go Corp. and PenWindows TM from MicroSoft TM, but further rapid developments in this area are to be expected.

The Stylus

A variety of technologies can be used to allow the computer system to sense the position of the stylus point[3], but the choice of those technologies is not particularly relevant to the present invention.

[3] Penpoint technologies may use an "active" stylus, which contains electronic circuits, or a purely passive stylus, which simply functions as a conductive element to contact a matrix of conductors, or even simply as a mechanical element to contact a 2-dimensional-sensing surface at a certain point. An active stylus may be cabled to the computer chassis or may be wireless.

Light Pen

Computer researchers have recognized for many years that stylus input, onto a display screen which was also a stylus-sensitive input screen, was an attractive input technology. Thus, for example, as early as the 1960s some large high-cost computers used a "light pen" interface, where the computer could sense position of a stylus which the user held up to the screen.[4] However, a protracted session of light pen use on a large vertical display can rapidly become extremely uncomfortable to the user's arms and shoulders. Thus, light pen technology never achieved widespread use.

[4] With a raster-scanned CRT display, this can be accomplished by connecting a photo-detector to sense illumination at the tip of the stylus. By looking for a pulsed component at the frame scan frequency, and then finding the phase of these pulses with respect to the vertical and horizontal blanking intervals, the X-Y position of the stylus within the raster scan field can be directly determined. The light pen could be, for example, simply an optical fiber connected to a transparent stylus tip, with the optical fiber plugged into a photo-detector on the computer chassis (or terminal chassis).

Combined Stylus and Keyboard Input

It is generally acknowledged however, that a conventional keyboard is a faster means of data entry provided that both hands are free to type and the keyboard and display are in an ergonomically acceptable configuration. Thus, a computer which is easily converted from a dedicated clipboard-type stylus input configuration into a conventional clamshell keyboard input notebook configuration, and vice versa, is desirable.

Several attempts have been made to address the problem of both keyboard and stylus input. (Examples of such efforts include the Tusk and Momenta products in the articles cited above.)

One attempt which has been made to reconcile these demands was to provide a clipboard-type computer with a remote keyboard connected by an electrical cable. This structure is believed to be incorporated, for example, in the Momenta and Grid computers now available. The disadvantage of this is that the keyboard is not integral to computer, thus requiring the carrying and storage of an additional system component if keyboard data entry is anticipated. However, an advantage of this approach is that, if keyboard data entry is never needed, the system unit may be smaller and lighter.

Another suggestion was a clipboard-type computer which uses software to generate an image of a keyboard on the display. The user activates specific keystrokes by touching or tapping the display surface with the stylus. (This structure is believed to be incorporated, for example, in the Grid computer now available.) The disadvantage of this is that it is not compatible with touch-typing, and thus gives slow character entry speed. However, an advantage is that the simulated keyboard is integral with the system, requires no additional components, and does not any size or weight.

Ergonomics

Mobile users often must enter data while standing, holding the computer unit in one hand (with the display exposed and firmly supported), and the stylus in the other. In a sitting position, it should also be possible to use the stylus with one hand while balancing the computer on the user's knee, leaving one hand free.

On the other hand, a palmtop computer used for typing must meet the same criteria as any other keyboard-entry device: the typing position should permit a seated user to keep both hands on the keyboard, and to see the display clearly, without strain in wrists, upper back, or neck.

The question is how the capability for both stylus input and keyboard entry can be achieved. It is difficult enough to achieve any sort of keyboard input capability, in a very small portable computer, which is adequate for rapid typing. It is even more difficult to combine this input with a capability for stylus input.

A particular problem is the ergonomics of display access. When the user is using the stylus, the display screen unit should ideally be thin and approximately flat (so the user can hold it in one hand or balance it on a knee); but when the user is using the keyboard, the unit should be supported in a position and configuration which makes the screen easily readable (i.e. 50 to 90 degrees from horizontal). No known design has provided a stand which is stable and provides this support angle and does not detract from the portability of the computer.

In particular, such a computer would typically be used in a very confined spaces (such as the snack tray of a coach airline seat). In such spaces, minimizing footprint is a key consideration. Ideally such a stand should not increase the computer's footprint at all, whether the stand is folded up or in use.

Innovative Computer System and Method

The present invention discloses a new way to permit both keyboard and stylus input in a very small compact computer.

The present application teaches a novel computer system which provides convenient and ergonomically advantageous capability for both keyboard input and stylus input. A primary system chassis contains the CPU and the power supply, and other key components, and also contains a bay in its underside where a detachable keyboard can be stored. To allow the keyboard to be as wide as possible, this bay preferably runs across the full width of the computer, and is enclosed on only two sides. A mechanical retainer holds the keyboard in this bay, with its keys protected, until the user needs to configure the computer for keyboard input. A separate detachable display module includes the display and a hinged connector. The display and keyboard can dock to the primary system chassis in different orientations, to produce at least three possible operating and/or transport configurations:

In a first position, the keyboard is mounted on the top of the chassis. The display module is plugged into a first connector at the edge of the chassis, and is folded backwards (from the keyboard location) so that a user can place the computer on a desk in front of him, and type on the keyboard with both hands while looking at the display. In this configuration, the portable computer of the present invention resembles a conventional notebook computer.

In a second position, the display module is mounted on top of the system chassis with its display side outward, while the keyboard is safely stored in its bay. In this configuration, the computer provides a small unit which can be carried in one hand, with the display/-touch-screen exposed. Thus, the user can hold it in one hand and wield the stylus in the other, as is desirable for a stylus-operated computer.

In a third position, the display is folded flat against the system chassis, with its back (nondisplay) side facing outward, while the keyboard is safely stored in its bay. This position provides a conveniently stable and durable closed position for carrying the computer.

Figure 1A:
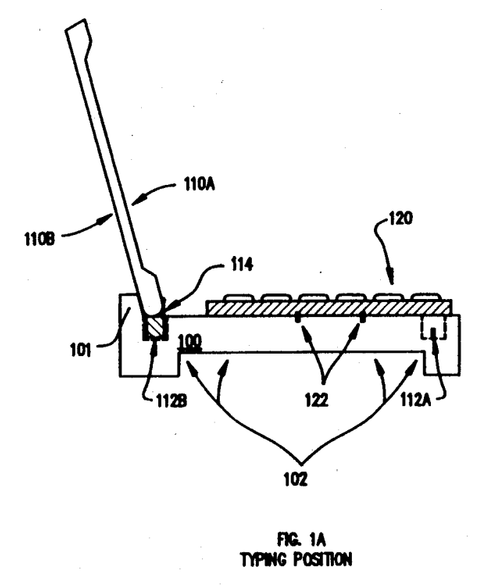
FIG. 1A shows this system configured for keyboard input.
Figure 1B:
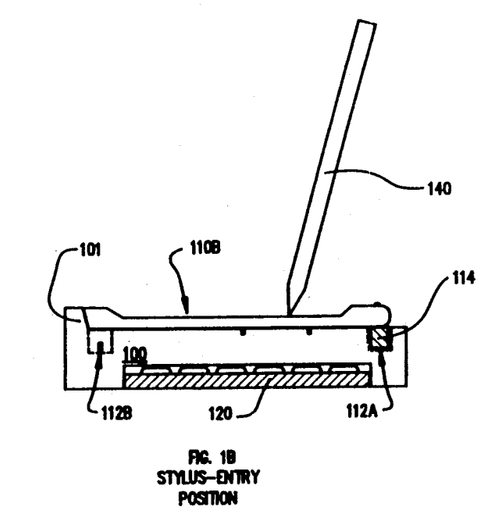
FIG. 1B shows this system configured for stylus input.
Figure 1C:
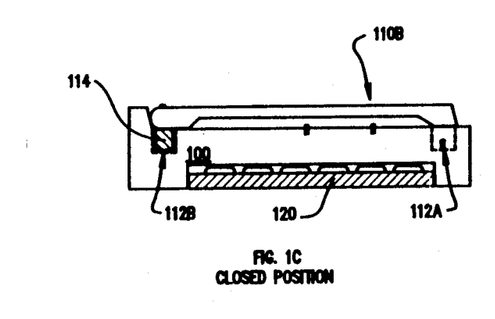
FIG. 1C shows this system in a closed position for storage or transport.
Figure 2A:
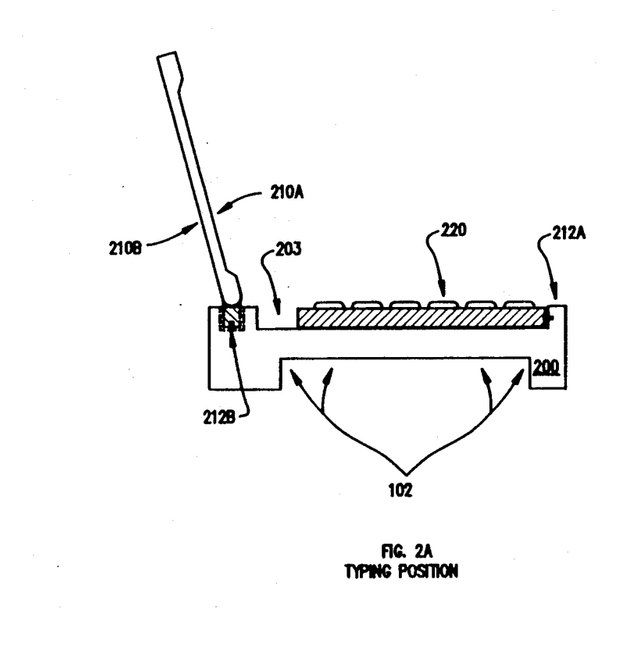
FIG. 2A shows this system configured for keyboard input.
Figure 2B:
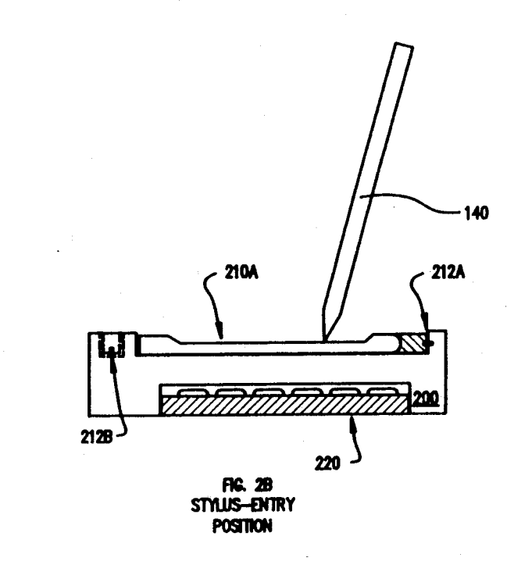
FIG. 2B shows it configured for stylus input.
Figure 2C:
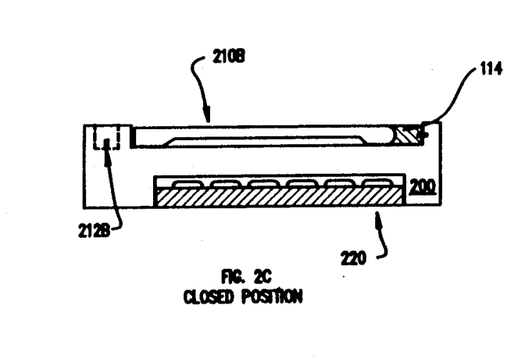
FIG. 2C shows it configured in a closed position for storage or transport.
Figure 3A:
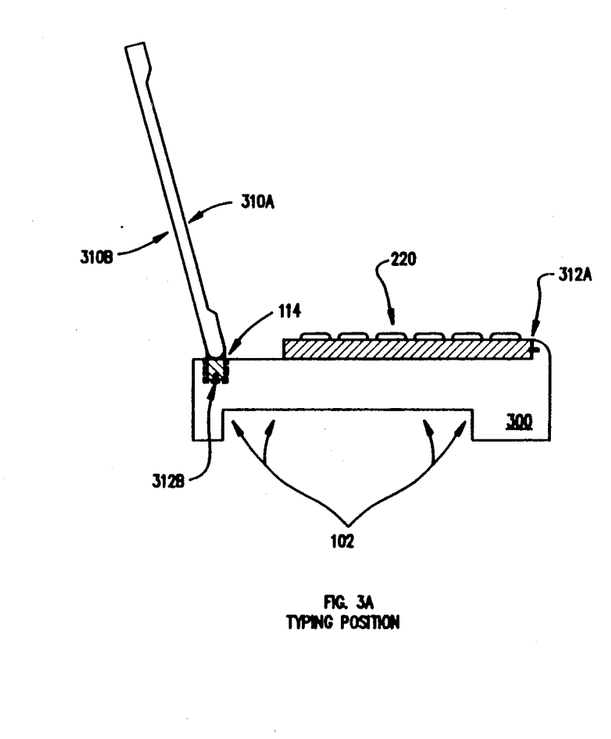
FIG. 3A shows this system configured for keyboard input.
Figure 3B:
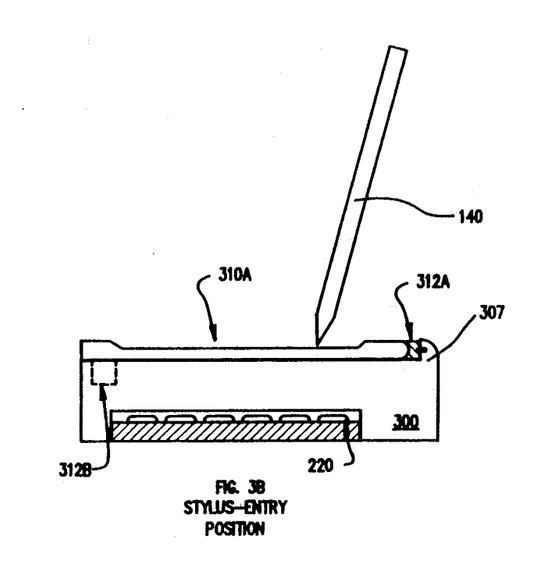
FIG. 3B shows it configured for stylus input.
Figure 3C:
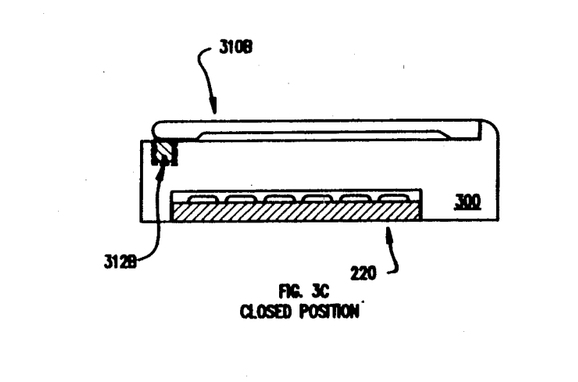
FIG. 3C shows it configured in a closed position for storage or transport.
Figure 4A:
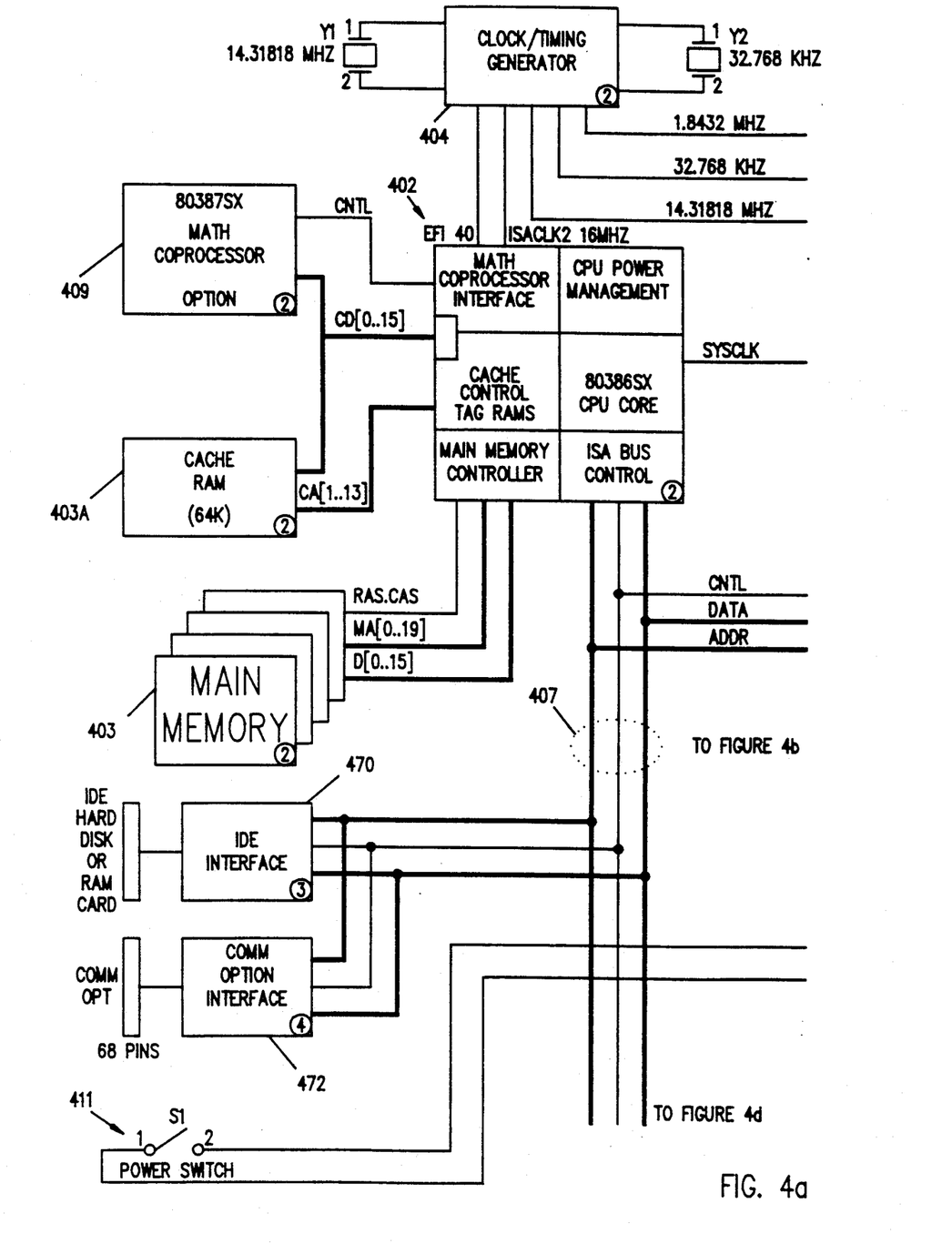
FIG. 4 shows a block diagram of the electronic organization of a sample pen-and keyboard-operated computer according to FIGS. 1, 2, or 3.
Figure 4B:
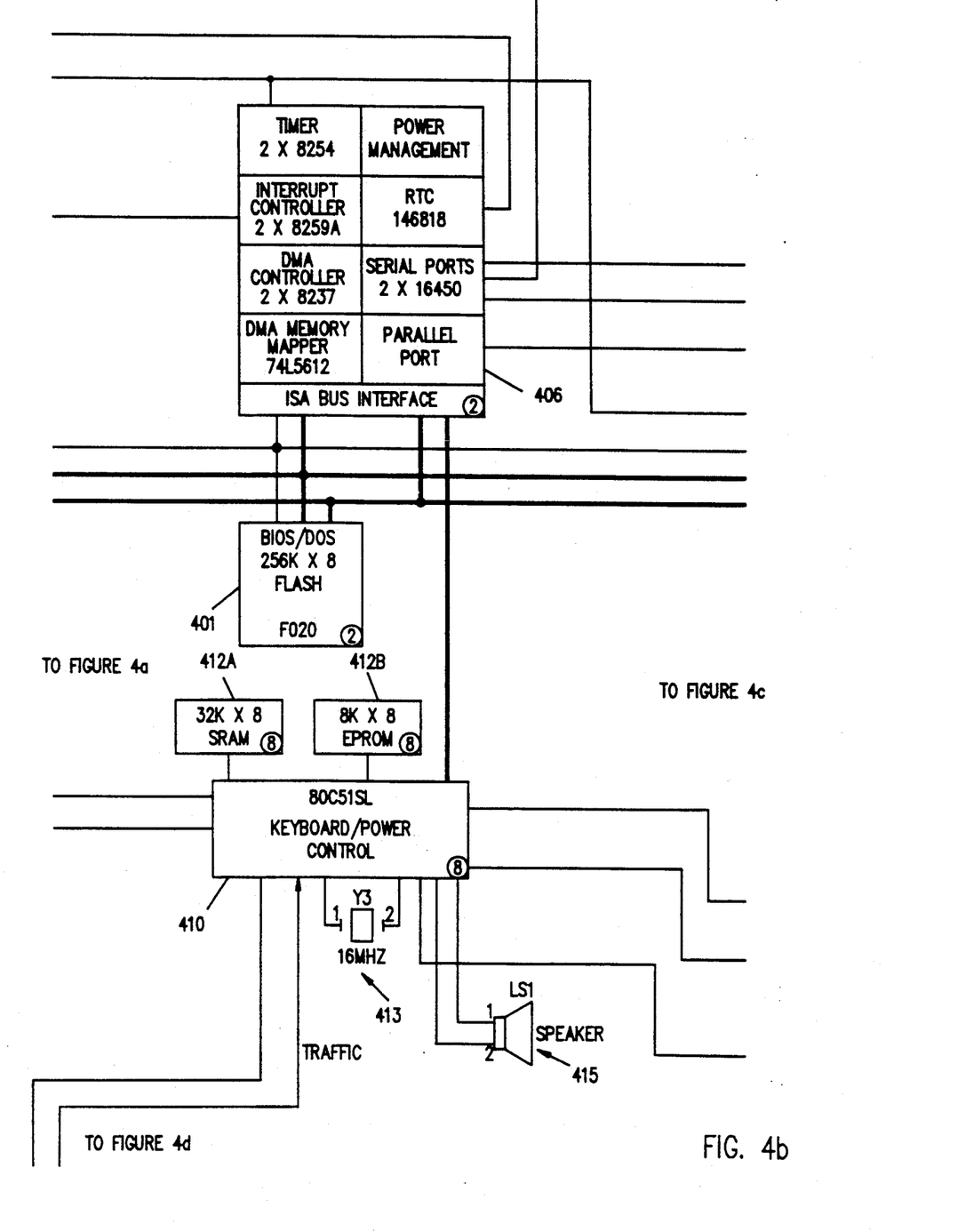
Figure 4C:
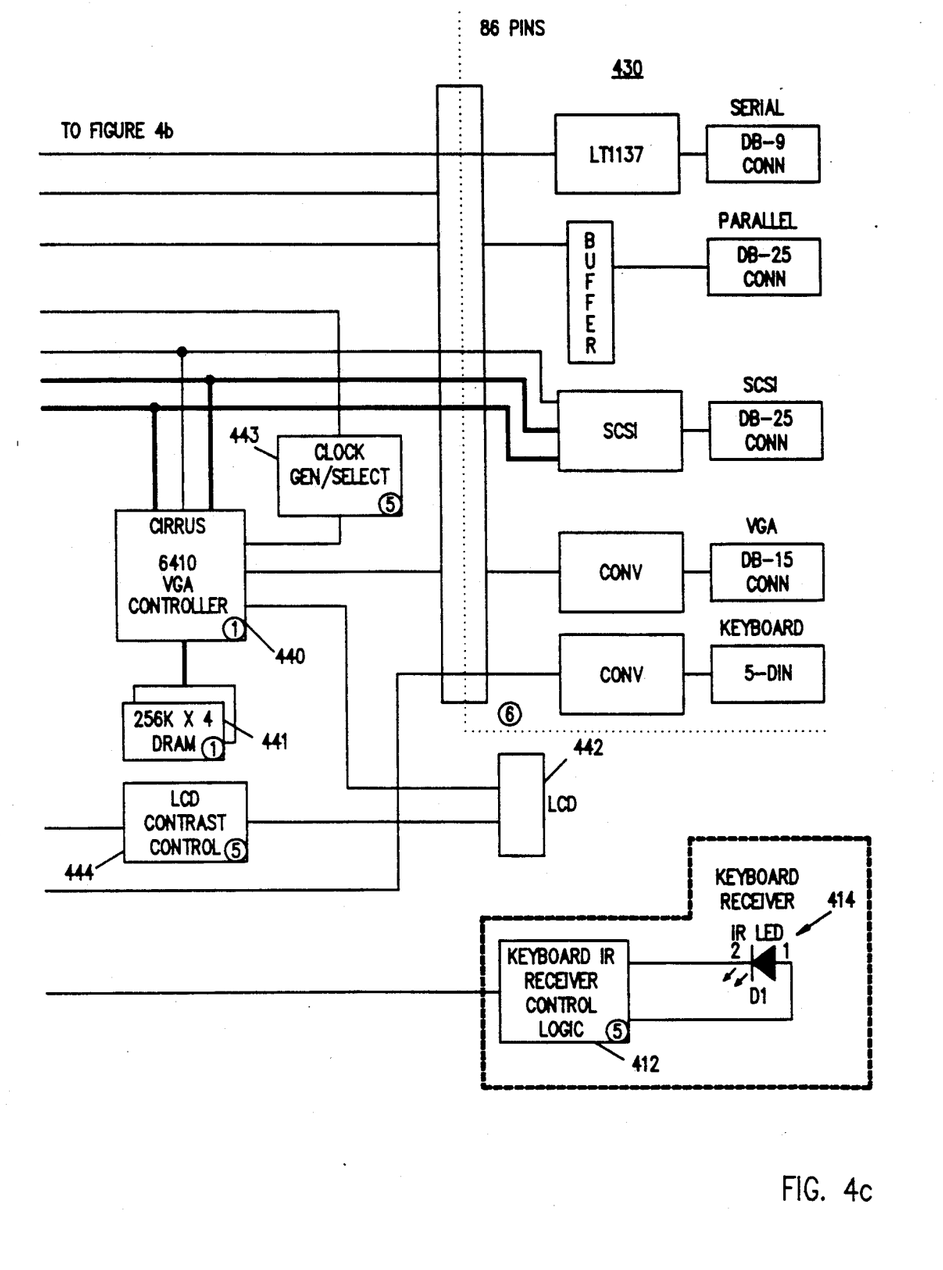
Figure 4D:
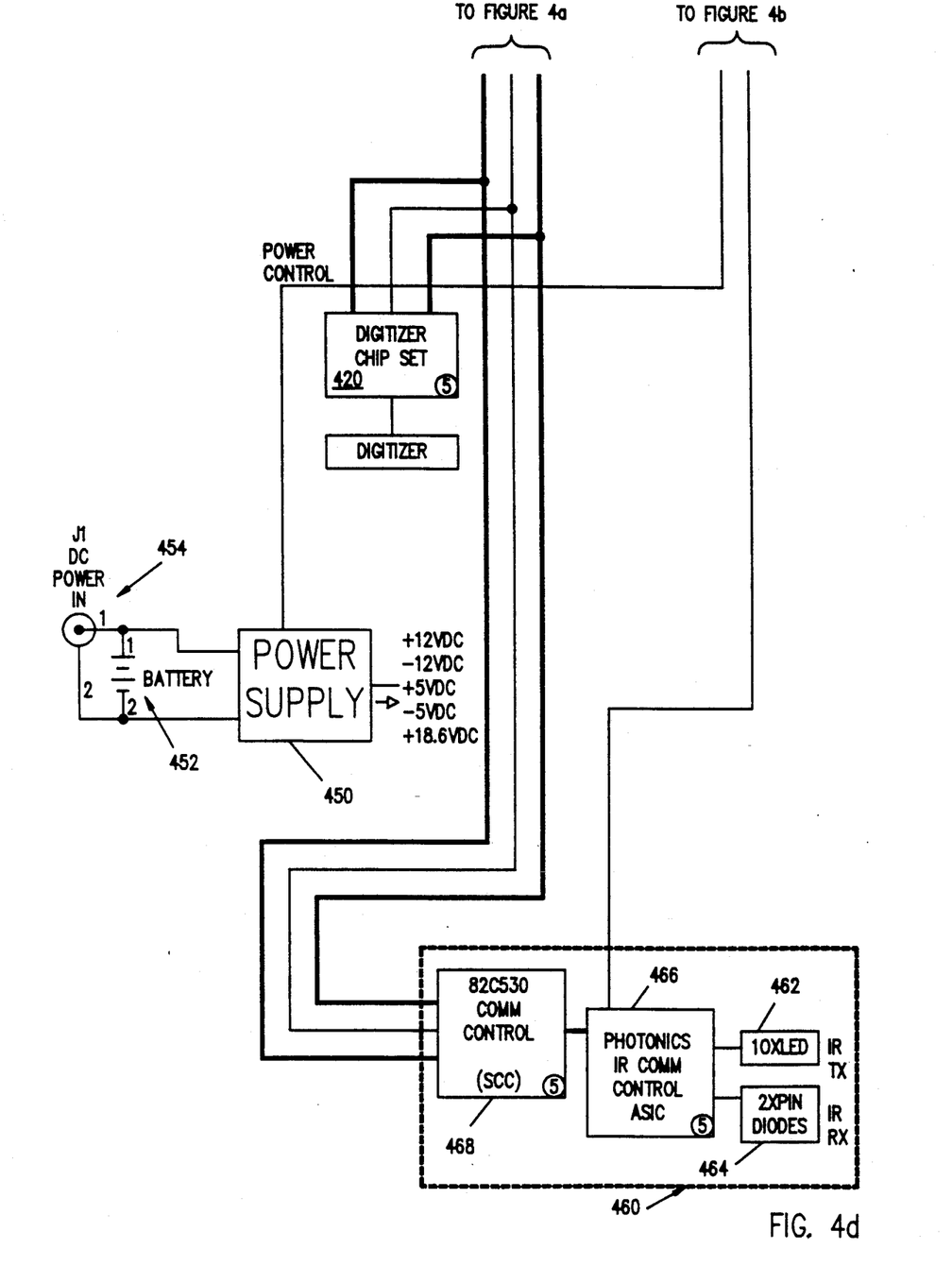

Three main classes of embodiments are disclosed. The first class of embodiments is shown in FIGS. 1A-1C, the second class of embodiments is shown in FIGS. 2A-2C, and the third class of embodiments is shown in FIGS. 3A-3C.

As the display element and keyboard are both detachable, a means of electrical interconnect is required. For the display element, the interconnect is effected by means of a multi-pin connector mounted in a housing which rotates approximately 120 degrees about an axis parallel to the attachment edge of the display element. The rotating connector provides both the system adaptability as well as the freedom of motion necessary for display element angle adjustment.

The keyboard interconnect is provided by a multi-pin connector on the bottom surface of the keyboard housing mating to a corresponding connector on the top surface of the system.

The system's center of gravity is not moved substantially by reconfiguration. The heavy components (battery, main circuit board, and disk drive if present) are contained within the system base. Thus, the system remains stable in the keyboard input configuration, despite the unbalancing effect of the display element.

BRIEF DESCRIPTION OF THE DRAWING

The present invention will be described with reference to the accompanying drawings, which show important sample embodiments of the invention and which are incorporated in the specification hereof by reference, wherein:

FIGS. 1A-1C show a first computer system embodiment, in which the chassis includes a berm to support the display module in the typing position.

FIGS. 2A-2C show a second computer system embodiment, in which the chassis includes a lateral connector in a topside recess.

FIGS. 3A-3C show a third computer system embodiment, in which the chassis includes lateral contacts in a raised front lip.

DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

First Class of Embodiments

FIGS. 1A-1C show a first embodiment of the computer system of the presently preferred embodiment. In this embodiment the chassis 100 includes a berm 101, which helps to support the display module 110 in the typing position (shown).

FIG. 1A shows the system of the first embodiment configured for keyboard input. Two multipin connector sockets 112A and 112B provide alternative connection positions for the display module 110.

In the typing positions shown, the display module 110 is plugged into the rear connector socket 112B, so that the display side 110A of the display module is readily visible to the user. The display side 110A of the display module in the presently preferred embodiment, also includes sensing circuitry for detection of the position of a stylus. (The primary position for stylus use is as shown in FIG. 1B, but it is preferred (although not strictly necessary) that the stylus can also be used in the position of FIG. 1A. Thus, this position permits stylus input and keyboard input to be combined.)

The keyboard 120 is mounted atop the chassis 100, accessible for touch-typing, and mates with signal pins 122 on the top surface of the chassis. In this Figure, note that the bay 102 is visible. This is simply a cavity in the bottom of the chassis 100, which is sized to fit the keyboard 120. Note that, in the presently preferred embodiment, this cavity extends all the way through the chassis 100 from side to side. This permits the keyboard to be as wide as possible, consistent with the overall width of the chassis 100.

FIG. 1B shows the system of the first embodiment configured for stylus input. In the stylus-entry position shown, the display module 110 is plugged into the front connector socket 112A, and folded back against the chassis 100, so that the display side 110A of the display module is readily visible to the user and readily accessible to the user's stylus 140. (Comparison of FIGS. 1A and 1B shows how the hinged portion 114 of the display module is movable.) The keyboard 120 is mounted in bay 102 of chassis 100, for safe storage. (A mechanical clip, not shown, prevents the keyboard from falling out.) The stylus 140, in the presently preferred embodiment, is an active stylus which is wired to its own connector in the chassis, and which docks in a hole in the chassis. (Note that the display module 110 of this embodiment preferably includes a slope in one edge which is complementary to the slope of the inner edge of berm 101.)

FIG. 1C shows the system of the first embodiment in a closed position for storage or transport. In this position, as in the position of FIG. 1A, the hinged portion 114 of display 110 is inserted into the rear connector 112B. However, in this position the display module 110 is folded forward, against the top surface of chassis 100, to protect the display side 110A. The exposed back side 110B is simply blank plastic.

Second Class of Embodiments

FIGS. 2A-2C show a second embodiment of the computer system of the presently preferred embodiment. Note that, in this embodiment, the chassis 200 includes a recess 203 in its topside into which keyboard 220, or display module 210, can be docked. The recess includes a lateral connector 212A, which can mate either to the keyboard or to the display module. (Thus, the keyboard 220 of this embodiment has a different connector geometry from the keyboard 120 of the first embodiment.)

FIG. 2A shows the system of the second embodiment configured for keyboard input. Keyboard 220 is housed in recess 203 (where it is accessible for touch-typing), and is docked to connector 212A. In the typing position shown, the display module 210 is plugged into the rear connector socket 212B, so that the display side 210A of the display module 210 is readily visible to the user. (The display module 210 of this embodiment differs from display module 110 of the first embodiment in being shaped to fit within the recess 203, and in not having a sloped edge.) The display side 210A of the display module 210, in the presently preferred embodiment, also includes sensing circuitry for detection of the position of a stylus.

FIG. 2B shows the system of the second embodiment configured for stylus input. In this position, keyboard 220 is stored in bay 102. Display module 210 lies flat in recess 203 (where it is readily visible to the user, and is accessible for stylus entry), and is connected, through its movable portion 114, to connector 212A.

FIG. 2C shows the system of the second embodiment configured in a closed position for storage or transport. In this position, as in the position of FIG. 2B, the hinged portion 114 of display 110 is inserted into the lateral front connector 212A; but in this position the connection is simply for physical security, and to protect the connector. In this position the display module 210 is face down against the top surface of chassis 100, protecting the display side 210A. The exposed back side 210B is simply blank plastic.

Third Class of Embodiments

FIGS. 3A-3C show a third embodiment of the computer system of the presently preferred embodiment. In this embodiment, the chassis includes a raised front lip 307 with a lateral contact 312A on the inner edge thereof.

FIG. 3A shows the system of the third embodiment configured for keyboard input. (The display module 310 of this embodiment, unlike display module 210 of the second embodiment, does not have to fit within recess 203.) The display side 310A of the display module 310, in the presently preferred version of this embodiment, also includes sensing circuitry for detection of the position of a user stylus 140.

FIG. 3B shows the system of the third embodiment configured for stylus input. In this position, keyboard 220 is stored in bay 102. Display module 310 lies flat on the top side of chassis 300 (where it is readily visible to the user, and is accessible for stylus entry), and is connected, through its movable portion 114, to lateral connector 312A.

FIG. 3C shows the system of the third embodiment configured in a closed position for storage or transport. In this position, as in the position of FIG. 3A, the hinged portion 114 of display 310 is inserted into the rear connector 312B. However, in this position the display module 310 is folded forward, against the top surface of chassis 300, to protect the display side 310A. The exposed back side 310B of display module 310 is simply blank plastic.

Example of Internal Hardware

FIG. 4 shows a block diagram of the electronic organization of a sample pen- and keyboard-operated computer. (Of course, other organizations can be used instead; this organization is provided merely as one example of a context for use of the claimed inventions.)

In this example, a processor chipset 402 and 406, similar to the Intel 386SL chipset, is used. (Of course, a very wide variety of other chipsets can be used instead.) Chip 402 includes the 386SX processor core, and also includes ISA bus control logic (connected to ISA bus 407). Chip 402 also includes memory controller logic (connected to main memory 403 by 20 address lines, 16 data lines, and RAS and CAS strobe signals). Chip 402 also includes cache control tag RAMs (connected to cache RAM 403A). Chip 402 also includes math coprocessor interface logic (connected to optional math coprocessor 409). Chip 402 also includes CPU power management logic. Chip 402 receives a clock input (16 MHz in this example) from clock/timing generator 404.

Chip 406 is connected to receive clock line SYSCLK from chip 402. Chip 406 also includes timer logic (approximately equivalent to two 8254s), which is connected to receive a 14.31818 MHz clock signal from clock generator 404. Chip 406 also includes interrupt controller logic (approximately equivalent to two 8259As). Chip 406 also includes DMA controller logic (approximately equivalent to two 8237s). Chip 406 also includes bus interface logic which is connected to the bus 407. Chip 406 also includes power management logic, and a real-time clock (approximately equivalent to a 146818), which is connected to receive a 32.768 KHz signal from clock generator 404. Chip 406 also includes serial port control logic (approximately equivalent to two 16450s), which is connected to receive a 1.8432 MHz signal from clock generator 404.

Flash EPROM 401 contains code for BIOS and for the operating system (e.g. DOS). This chip, in the presently preferred embodiment, is a 256K×8 memory.[5]

[5] See commonly-owned U.S. patent application Ser. No. 706,750, filed May 29, 1991, which is hereby incorporated by reference. This application discloses a computer system in which the basic system software can be electrically rewritten. This system provides some significant safeguards against data corruption.

A microcontroller 410 (an 80C51SL, in the presently preferred embodiment) monitors user inputs to the soft power switch 411, and also receives keyboard inputs (through photodiode 414 and associated control logic 412). Associated with this microcontroller are SRAM 412A (32K×8 in this sample embodiment), EPROM 412B (8K×8 in this sample embodiment), and resonant crystal 413 (16 MHz in this sample embodiment). This microcontroller is also connected to control speaker 415.

Microcontroller 410 is also connected to a medium-speed general-purpose two-way wireless interface, implemented by logic 460. This logic includes an array of several (e.g. ten) LEDs 462 for transmission, and an array of two infrared PIN diodes 464 for reception. This interface provides the capability for a highly flexible portable wireless interface, which can provide (in effect) the capability of a self-connecting and self-configuring LAN, with the proper software. These diodes are driven by an IR communications driver 466 (which, in the presently preferred embodiment, is a Photonics chip), and interface to bus 407 through control chip 468.

Microcontroller 410 is also connected to LCD contrast control logic 444. This logic, together with video signals from the VGA controller 440 (which is a Cirrus 6410 in the presently preferred embodiment), controls the LCD display 442. VGA controller 440 is also connected to local DRAM 441, and a programmable pixel clock 443.

Also connected to bus 407 is an IDE interface 470, which is connectible to the internal hard disk drive (or to a semiconductor mass-memory drive emulation, if a diskless configuration is chosen). Also connected to bus 407 is optional interface logic 472, which can be connected to a modem or a LAN interface card.

Also connected to bus 407 is a digitizer chip set 420, which is connected to detect and measure the movements of the computer's stylus.

Power supply 450 is driven by battery 452, and also be powered by in input socket 454. This power supply, in the presently preferred embodiment, provides output voltages of ±5V, ±12V, and ±18.6V. However, of course, lower logic supply voltages may be used in future embodiments.

An "I/O Slice" 430 plugs into the side of the computer's chassis 100 using a special 86-pin connector. This connector expansion unit provides industry-standard connectors for serial ports (DB-9), parallel ports (DB-25), SCSI interface (DB-25), and for optional docking to external display (DB-15VGA) and/or keyboard (DIN 5-pin) units.

Further Modifications and Variations

It will be recognized by those skilled in the art that the innovative concepts disclosed in the present application can be applied in a wide variety of contexts. Moreover, the preferred implementation can be modified in a tremendous variety of ways. Accordingly, it should be understood that the modifications and variations suggested below and above are merely illustrative. These examples may help to show some of the scope of the inventive concepts, but these examples do not nearly exhaust the full scope of variations in the disclosed novel concepts.

For example, the keyboard can be cabled to the chassis, or linked by an infrared transceiver, in place of the connector configurations shown. Similarly, the stylus may have a cabled link to the chassis, or may have a wireless data link, or may even be a purely passive stylus (in which case the position-sensing electronics are located in the display module).

As will be recognized by those skilled in the art, the innovative concepts described in the present application can be modified and varied over a tremendous range of applications, and accordingly the scope of patented subject matter is not limited by any of the specific exemplary teachings given.

What is claimed is:
1. A computer system, comprising:
a keyboard dimensioned for touch-typing;
a primary system chassis which contains a CPU, a power supply, a program memory, and at least one data communications interface;
said primary system chassis also being shaped to define a bay, in the exterior thereof, which is dimensioned to hold said keyboard removably but securely;
said primary system chassis having a top surface and first and second long edges in proximity to said top surface, and containing therein a first connector in proximity to said first long edge and a second connector in proximity to said second long edge, said CPU being operatively connected to send display signals to first connector and to said second connector;
a display module having therein a third connector which is complementary to said first connector and is also substantially complementary to said second connection, and also including display electronics which provide a visible display corresponding to signals written in through said connector, said display and said chassis alternatively positionable in a first alternative position in which said third connector is mated to said second connector, said display module is folded backward to exposed said visible display and said keyboard is mounted on said top surface and in a second alternative position in which said third connector is mated to said first connector and said keyboard is stored in said storage bay; and
stylus position-sensing electronics which are connected to sense the position of a user-operated stylus which may be in proximity to said visible display, and to provide electronic output to said CPU accordingly.

2. The system of claim 1, wherein said stylus position-sensing electronics comprise a stylus which includes active electronic circuitry.

3. The system of claim 1, wherein said stylus position-sensing electronics comprise a stylus which includes active electronic circuitry and wireless transceiver circuitry.

4. The system of claim 1, wherein said chassis comprises a fourth connector, and said stylus position-sensing electronics comprise a stylus connected by a cable to said fourth connector.

5. The system of claim 1, wherein said display and said chassis are alternatively positionable, in a third alternative position, in which said display module is mounted against said top surface of said chassis and said keyboard is stored in said storage bay.

6. A computer system, comprising:
a keyboard having more than 77 keys and dimensioned for touch-typing;
a primary system chassis which contains a CPU, a power supply, a program memory, and at least one data communications interface;
said primary system chassis also being shaped to define a bay, in the exterior thereof, which is dimensioned to hold said keyboard removably but securely with said keys inward;
said primary system chassis having a top surface and first and second long edges in proximity to said top surface, and containing therein a first connector in proximity to said first long edge and a second connector in proximity to said second long edge, said CPU being operatively connected to read and write to first connector and to said second connector;
a display module having therein a third connector which is complementary to said first connector and is also substantially complementary to said second connector, and also including display electronics which provide a visible display corresponding to signals written in through said connector, said display and said chassis alternatively positionable in a first alternative position in which said third connector is mated to said second connector, said display module is folded backward to expose said visible display and said keyboard is mounted on said top surface and in a second alternative position in which said third connector is mated to said first connector and said keyboard is stored in said storage bay; and
stylus position-sensing electronics which are connected to sense the position of a user-operated stylus which may be in proximity to said visible display, and to provide electronic output to said CPU accordingly.

7. The system of claim 6, wherein said first connector provides insertion substantially normal to said top surface of said chassis, and said second connector also provides insertion substantially normal to said top surface of said chassis.

8. The system of claim 6, further comprising a stylus removably mounted to said chassis.

9. The system of claim 6, wherein said top surface of said chassis is shaped to include a recess therein, and said first connector is located inside said recess and provides insertion substantially parallel to said top surface of said chassis, and said second connector provides insertion substantially normal to said top surface of said chassis.

10. The system of claim 6, wherein said top surface of said chassis is shaped to include a lip near said first edge thereof, and said first connector is located inside said lip and provides insertion substantially parallel to said top surface of said chassis, and said second connector provides insertion substantially normal to said top surface of said chassis.

11. The system of claim 6, wherein said stylus position-sensing electronics comprise a stylus which includes active electronic circuitry.

12. The system of claim 6, wherein said stylus position-sensing electronics comprise a stylus which includes active electronic circuitry and wireless transceiver circuitry.

13. The system of claim 6, wherein said chassis comprises a fourth connector, and said stylus position-sensing electronics comprise a stylus connected by a cable to said fourth connector.

14. The system of claim 6, wherein said display and said chassis are alternatively positionable in a third alternative position in which said display module is mounted against said top surface of said chassis and said keyboard is stored in said storage bay.

15. A portable computer system chassis having front, back, top and bottom sides and a recess formed in said bottom side, comprising:
first and second I/O display module connectors located on said top side proximate said front and back sides, respectively, said I/O display module connectors adapted to alternatively communicate with a I/O display module depending upon a desired computer configuration; and
a first keyboard connector located on said top side proximate said front side, said keyboard connector adapted to communicate with a keyboard when said I/O display module communicates with said second I/O display module connector, said keyboard stowed within said recess when said I/O display module communicates with said first I/O display module connector to thereby allow said chassis to be alternatively configured to be part of a keyboard-entry computer or a display-entry computer.

16. The chassis as recited in claim 15 wherein said chassis can be alternatively configured to be part of a combined keyboard-entry/display-entry computer.

* * * * *